United States Patent
Bai et al.

(10) Patent No.: US 8,238,757 B2
(45) Date of Patent: Aug. 7, 2012

(54) METHOD AND APPARATUS FOR GENERATING OPTICAL DUOBINARY SIGNALS WITH ENHANCED RECEIVER SENSITIVITY AND SPECTRAL EFFICIENCY

(75) Inventors: Yu Sheng Bai, Los Altos Hills, CA (US); Yanjun Zhu, Loughton (GB); Rong Zhang, Cupertino, CA (US); Jizhong Liu, Shenzhen (CN); Jian Deng, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 949 days.

(21) Appl. No.: 11/865,508

(22) Filed: Oct. 1, 2007

(65) Prior Publication Data

US 2008/0175594 A1    Jul. 24, 2008

Related U.S. Application Data

(60) Provisional application No. 60/881,120, filed on Jan. 18, 2007.

(51) Int. Cl.
 *H04B 10/04* (2006.01)
(52) U.S. Cl. ........ 398/183; 398/140; 398/147; 398/161; 398/186
(58) Field of Classification Search .............. 398/183, 398/140, 161, 186, 187, 188, 191, 193, 147, 398/148
See application file for complete search history.

(56) References Cited

U.S. PATENT DOCUMENTS

| | | | |
|---|---|---|---|
| 5,543,952 A | 8/1996 | Yonenaga et al. | |
| 5,867,534 A | 2/1999 | Price et al. | |
| 5,917,638 A | 6/1999 | Franck et al. | |
| 6,147,788 A * | 11/2000 | Mamyshev et al. | 398/80 |
| 6,621,945 B2 * | 9/2003 | Bissessur | 359/237 |
| 6,623,188 B1 * | 9/2003 | Dimmick et al. | 398/182 |
| 6,850,713 B2 * | 2/2005 | Kikuchi et al. | 398/201 |

(Continued)

FOREIGN PATENT DOCUMENTS

CN    1419348 A    5/2003

(Continued)

OTHER PUBLICATIONS

Foreign Communication From a Related Counterpart Application—International Search Report and Written Opinion, PCT/CN2008/070102, Apr. 10, 2008, 14 pages.

(Continued)

*Primary Examiner* — Kenneth N Vanderpuye
*Assistant Examiner* — Hibret Woldekidan
(74) *Attorney, Agent, or Firm* — Conley Rose, P.C.; Grant Rodolph

(57) ABSTRACT

An optical network transmitter comprising a fractional-bit delay module, an optical modulator coupled to the fractional-bit delay module, and a band-limiting optical filter coupled to the optical modulator. Also disclosed is a transmission system comprising a source configured to generate two complementary binary data streams, a fractional-bit delay module in communication with the source and configured to delay one of the complementary binary data streams, a modulation module in communication with the source and the fractional-bit delay module and configured to convert the undelayed complementary binary data streams and the delayed complementary binary data streams into a fractional-bit delayed optical duobinary signal, and a band-limiting node in communication with the modulation module and configured to filter and transmit the optical duobinary signal.

23 Claims, 9 Drawing Sheets

U.S. PATENT DOCUMENTS

| | | | |
|---|---|---|---|
| 7,206,519 B2 * | 4/2007 | Lee et al. | 398/188 |
| 7,280,767 B1 * | 10/2007 | Ho et al. | 398/183 |
| 7,373,089 B2 * | 5/2008 | Yu et al. | 398/193 |
| 7,386,239 B2 * | 6/2008 | Lee et al. | 398/183 |
| 7,486,897 B2 * | 2/2009 | Kim et al. | 398/183 |
| 7,899,324 B2 * | 3/2011 | Anderson et al. | 398/25 |
| 7,949,261 B2 * | 5/2011 | Mikkelsen et al. | 398/208 |
| 2002/0057478 A1 | 5/2002 | Bissessur et al. | |
| 2002/0171900 A1 * | 11/2002 | Ono et al. | 359/181 |
| 2003/0090770 A1 | 5/2003 | Bissessur | |
| 2003/0165341 A1 | 9/2003 | Bulow | |
| 2003/0175036 A1 * | 9/2003 | Mamyshev et al. | 398/188 |
| 2003/0189745 A1 * | 10/2003 | Kikuchi et al. | 359/237 |
| 2004/0052532 A1 * | 3/2004 | Morita et al. | 398/140 |
| 2004/0105686 A1 * | 6/2004 | Lee et al. | 398/188 |
| 2005/0100346 A1 * | 5/2005 | Kim et al. | 398/188 |
| 2005/0201762 A1 * | 9/2005 | Moeller et al. | 398/202 |
| 2006/0164145 A1 * | 7/2006 | Poskatcheev | 327/276 |
| 2006/0193229 A1 * | 8/2006 | Bai | 369/59.23 |
| 2007/0116476 A1 | 5/2007 | Bai | |
| 2008/0063396 A1 * | 3/2008 | Yu et al. | 398/42 |
| 2009/0136240 A1 * | 5/2009 | Malouin et al. | 398/183 |

FOREIGN PATENT DOCUMENTS

| | | |
|---|---|---|
| CN | 1442975 A | 9/2003 |
| CN | 1859044 A | 11/2006 |
| EP | 1271808 A2 | 1/2003 |

OTHER PUBLICATIONS

Foreign communication from counterpart application—European application 08700115.2, Supplementary European Search Report and Opinion, dated Feb. 12, 2010, 6 pages.

Kim, Hoon, et al., "Optical Duobinary Transmission System Featuring Improved Receiver Sensitivity and Reduced Optical Bandwidth," IEEE Photonics Technology Letters, Aug. 2002, pp. 1205-1207, vol. 14, No. 8.

Penninckx, D., "Enhanced-phase-shaped binary transmission," Electronics Letters, Mar. 2, 2000, pp. 478-480, vol. 36, No. 5.

Xie, Chongjin, et al., "Improvement of Optical NRZ- and RZ-Duobinary Transmission Systems With Narrow Bandwidth Optical Filters," IEEE Photonics Technology Letters, Sep. 2004, pp. 2162-2164, vol. 16, No. 9.

Zheng, Xueyan, et al., "Receiver Optimization for 40-Gb/s Optical Duobinary Signal," IEEE Photonics Technology Letters, Jul. 2001, pp. 744-746, vol. 13, No. 7.

Foreign Communication From A Realted Counterpart Application, European Application 08700115.2, European Office Action dated May 21, 2012, 5 pages.

* cited by examiner

METHOD AND APPARATUS FOR GENERATING OPTICAL DUOBINARY SIGNALS WITH ENHANCED RECEIVER SENSITIVITY AND SPECTRAL EFFICIENCY

CROSS-REFERENCE TO RELATED APPLICATIONS

The present application claims priority to U.S. Provisional Patent Application Ser. No. 60/881,120, filed Jan. 18, 2007 by Bai et al. and entitled "Method and Apparatus for Generating Optical Duobinary Signals with Enhanced Receiver Sensitivity and Spectral Efficiency," which is incorporated by reference herein as if reproduced in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Optical transmission systems constitute the basic carrier for most telecommunication systems. Many optical transmission technologies are based on the principle of wavelength division multiplexing (WDM), where the transmission channels are carried by optical signals over different wavelengths or different bands of wavelengths. The optical signals are initially modulated at the transmitter end of the optical network, propagated through the network via an optical link, and then detected at the receiver end. The speed and quality of the optical transmission systems, including WDM systems, play a significant role in defining the overall speed and quality of the telecommunication networks. Therefore, enhancing the performance of optical transmission systems has been a factor in shaping and improving the world's telecommunication services.

The transmission system performance may be characterized by its spectral efficiency and its receiver sensitivity. Spectral efficiency may be defined as the system channel modulation rate divided by the wavelength spacing. For example, a system with a 10 gigabit per second (Gbit/s) modulation rate and 50 gigahertz (GHz) channel spacing has a spectral efficiency of 0.2 (20 percent). A higher spectral efficiency reflects more transmission signal capacity within a fixed bandwidth. In contrast, the receiver sensitivity is a measure of signal tolerance to noise, and usually refers to the lowest signal power wherein a certain bit error rate (BER), for example $10^{-9}$, can still be detected. Traditionally, modulation formats, such as return-to-zero (RZ) and non-return-to-zero (NRZ), have been applied in optical transmission systems. More recently, optical transmission systems have used an optical duobinary (ODB) modulation format, which has a narrower transmission spectrum and thus higher spectral efficiency and larger chromatic dispersion tolerance. These features have made ODB modulation more preferable than traditional modulations such as NRZ for 10 Gbit/s and higher bit rates transmission systems. Unfortunately, conventional ODB modulation formats suffer from low receiver sensitivity and hence high BERs.

SUMMARY

In one embodiment, the disclosure includes an optical network transmitter comprising a fractional-bit delay module, an optical modulator coupled to the fractional-bit delay module, and a band-limiting optical filter coupled to the optical modulator.

In another embodiment, the disclosure includes a method comprising generating two complementary binary data streams, delaying one of the complementary binary data streams, modulating an optical duobinary signal using the undelayed complementary binary data stream and the delayed complementary binary data stream, filtering the optical duobinary signal, and transmitting the filtered optical duobinary signal is transmitted to a receiver.

In a third embodiment, the disclosure includes a transmission system comprising a source configured to generate two complementary binary data streams, a fractional-bit delay module in communication with the source and configured to delay one of the complementary binary data streams, a modulation module in communication with the source and the fractional-bit delay module, and configured to convert the undelayed complementary binary data streams and the delayed complementary binary data streams into a fractional-bit delayed optical duobinary signal, and a band-limiting node in communication with the modulation module and configured to filter and transmit the optical duobinary signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an ODB configuration for an optical transmission system, which may comprise a differential fractional-bit delayed dual-drive optical modulator and band-limiting optical filters at both the transmitter and the receiver ends of the optical network. Using the ODB configuration, two pre-coded and complementary binary data streams may be individually amplified through a pair of matched driver amplifiers. The two binary data streams may be delayed with respect to one another by a fractional time delay, which may be less than one bit. The resulting fractional-bit delayed binary data streams may be then applied to the dual-drive optical modulator to produce ODB signals. The signals may be further band-limited at the transmitter by pre-filtering before transmission and at the receiver by post-filtering after transmission. The combination of the differential fractional-bit delayed dual-drive optical modulator and the band-limiting optical filters generate ODB signals that may have high spectral efficiency and highly receiver-sensitive. The high spectral efficiency may be caused by the band-limiting characteristic of the optical filters. The band-limiting characteristics described herein may have improved chromatic dispersion tolerance, as well as the ability to sustain a band-limited spectrum suitable for operations in band-limited wavelength spacing, such as 50 GHz dense WDM (DWDM) spacing at 40 Gbit/s. The enhanced receiver sensitivity may result from the band-limiting optical filtering as well as from the absence of electrical low pass filter (LPF) components, which are replaced by the differential fractional-bit delay mechanism. The absence of the LPF components may also make the ODB configuration simpler to implement.

Figure 1:
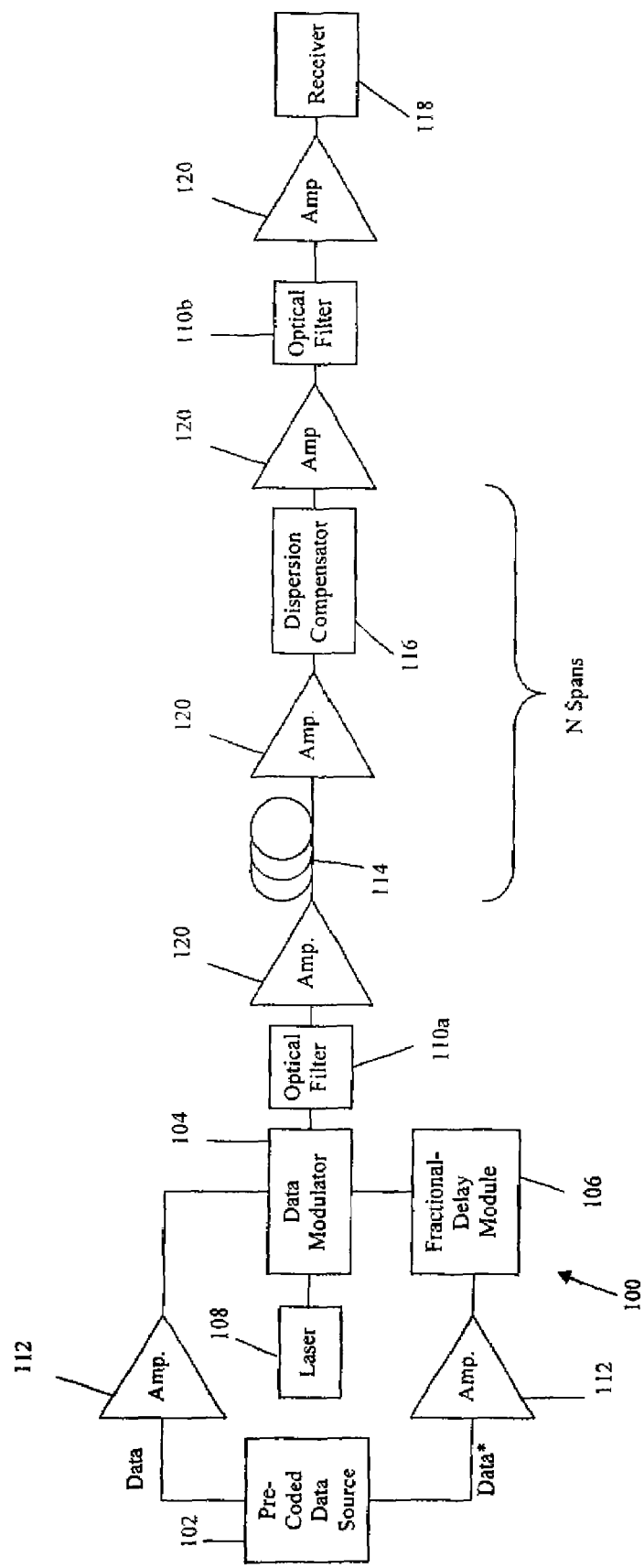
FIG. 1 is a schematic diagram of one embodiment of an ODB based system.

FIG. 1 illustrates one embodiment of a system 100 configured to implement the ODB modulation described herein. The system 100 may be any optical transmission system that uses active or passive components to transport ODB generated signals from a source to a receiver. For example, the system 100 may comprise a pre-coded data source 102, two data stream signal amplifiers 112, a laser 108, a fractional-delay module 106, a data modulator 104, at least two optical filters 110a and 110b, a plurality of optical amplifiers 120, a fiber 114, a dispersion compensator 116, and a receiver 118. In other embodiments, more or fewer components may be used as will be apparent to persons of ordinary skill in the art. The ODB signals generated by the signal may be three-level signals that compress conventional two-level binary signals into a smaller bandwidth. In order to generate ODB signals, one of two complementary binary data streams (indicated by the asterisk in FIG. 1) may be delayed by the fractional-delay module 106, and subsequently converted into three-level electrically driven signals. The three-level electrically driven signals may be then converted into optical signals by the data modulator 104, and may be then transported to the receiver 118 through the fiber 114. The system may operate at least about 10 Gbit/s, perhaps at about 40 Gbit/s or about 100 Gbit/s. The system 100 described herein may be part of a larger communication network, and/or may transport data between two separate networks.

The pre-coded data source 102 may be one component of the system 100. In an embodiment, the pre-coded data source 102 may be any device that is configured to receive a data stream, copy the data stream, and output the original and copied data streams. For example, the pre-coded data source 102 may send a binary data stream and a complementary binary data stream downstream towards the data modulator 104 through two separate paths. The pre-coded data source 102 also may be connected through one or a plurality of additional paths to one or a plurality of external networks, such as a wireless, Ethernet, or SONET/SDH networks.

The data stream signal amplifiers 112 may be any devices configured to amplify the complementary binary data streams, which may be attenuated as they travel from the pre-coded data source 102 to the data modulator 104 through two separate paths. In an embodiment, the two data stream signal amplifiers 112 may be preamp based circuits or other type of electronic circuits known to persons of ordinary skill in the art. In other embodiments, the system 100 may comprise more than two data stream signal amplifiers 112 in order to maintain data stream signal strength suitable for the operation of the data modulator 104.

Another component of the system 100 may be the fractional-delay module 106. The fractional-delay module 106 may be any device that is configured to introduce a fractional-bit delay to one of the complementary binary data streams that are sent from the pre-coded data source 102. In embodiments, the fractional-delay module may introduce a delay at about 0.9, about 0.8, about 0.7, about 0.6, about 0.5, about 0.4, about 0.3, or about 0.2 bit per second (bit/s) to the delayed complementary binary data stream. The fractional-delay module 106 may also introduce a variable fractional-bit delay to the complementary binary data stream that may be decided by the operator within a certain range, for example from about 0.3 bit/s to about 0.8 bit/s. The fractional-bit delayed complementary binary data stream may be then sent to a control arm on the data modulator 104. The fractional-delay module 106 may eliminate the need for an electrical low pass filter (LPF) in the system 100, thus the system may not contain a LPF, such as those suitable for high data rate modulation. The absence of a low insertion loss and an LPF may render the system 100 simpler to implement, in some embodiments.

The laser 108 may be another component of the system 100. The laser 108 may be any device configured to provide light input to the data modulator 104. The laser 108 may be a distributed feedback laser (DFB) that may comprise a laser diode situated in an optically active region structured as a diffraction grating. The laser 108 may be a fixed narrow bandwidth laser in that it emits light at a fixed central frequency. The laser 108 also may be a tunable laser with a range of variable frequencies that may be selected by the operator.

The data modulator 104 may be another component of the system 100. The data modulator 104 may be any optical device that is configured to transmit modulated optical signals based on pre-modulated control data streams. In an embodiment, the modulator may be a dual-drive Mach-Zehnder (MZ) interferometer modulator, wherein the MZ modulator may be connected to the pre-coded data source 102 via two separate control arms each having a separate path. The data modulator 104 may receive a first binary data stream from the pre-coded data source 102 through a first control arm, and a second fractional-bit delayed binary data stream, that is complementary to the first binary data stream, through a second control arm. The data modulator 104 may receive an optical input from the laser 108, modulate the optical input using the original and fractional-bit delayed complementary binary data streams, and transmit the modulated ODB signal downstream towards the optical filter 110a. In one embodiment, the data modulator 104 may be an optical wave-guide MZ modulator. In another embodiment, the data modulator 104 may be an opto-mechanical MZ interferometer.

The optical filters 110a and 110b may be two additional components of the system 100. The first optical filter 110a may be a transmitter (Tx) filter that is placed between the data modulator 104 and the fiber 114. The optical filter 110a may be a band-limiting optical filter that limits the spectral band of the modulated ODB signal from the data modulator 104. In an embodiment, the optical filter bandwidth should be from about 70 percent to about 80 percent of the data rate. In one embodiment, the optical filter 110a may be an optical interleaver comprising a three-port passive fiber that is used to combine two dense wavelength-division multiplexing (DWDM) channels into a composite signal stream in an interleaved manner based on multiple-beam interference. For example, the optical interleaver may take two multiplexed signals with 100 GHz spacing and interleave them, thereby creating a denser DWDM signal with channels spaced 50 GHz apart. The process can be repeated, creating even denser composite signals with 25 GHz or 12.5 GHz spacing by cascading a plurality of interleavers. For example, in most DWDM equipment with standard channel spacing of 100 GHz, forty channels may be supported by spacing the signal-carrying frequencies every 2.5 GHz. Similarly, the second optical filter 110b may be a receiver (Rx) filter that is placed between the fiber 114 and the receiver 118 in the system 100. In one embodiment, the optical filter 110a and the optical filter 110b may be optical interleavers based on step-phase Michelson interferometers. In another embodiment, the optical filter 110a and the optical filter 110b may be optical interleavers based on birefringent crystal networks. The optical filter 110a and the optical filter 110b also may be etalon filters, such as Fabry-Perot interferometers in the form of thin-film-coated optical glass. The optical filter 110b may be substantially identical to the optical filter 110a with similar spectral transmission characteristics. Alternatively, the optical filter 110b also may be a different type of filter than the optical filter 110a and may have different spectral transmission characteristics.

The optical amplifiers 120 may be any optical devices that amplify the ODB signal as it is being transported from the data modulator 104 to the receiver 118. Although four optical amplifiers 120 are shown in FIG. 1, the system 100 may comprise any number of optical amplifiers 120. Specifically, the optical amplifiers 120 may be placed between the optical filter 110a, the fiber 114, the dispersion compensator 116, the optical filter 110b, and the receiver 118, in order to compensate for the insertion losses of these components. In one embodiment, the optical amplifiers 120 may an Erbium-doped fiber amplifier, which can amplify light in the 1550 nm region when pumped by an external light source. In another embodiment, the optical amplifiers 120 may be Raman optical amplifiers. The optical amplifiers 120 also may be a combination of different types of optical amplifiers.

The fiber 114 component may be an optical fiber cable that connects the data modulator 104 on the transmission end to the receiver 118 on the receiver end. In an embodiment, the fiber 114 may be a single mode fiber, such as a G.652 single mode fiber (SMF), which is used to transport downstream the modulated ODB signal. In another embodiment, the fiber 114 may comprise multiple optical fibers combined to form one optical path between the transmitter end to the receiver end of system 100. The fiber 114 also may be comprised of multiple optical fibers concatenated in sequence using optical couplers along the optical path between the data modulator 104 and the receiver 118.

In an embodiment, the dispersion compensator 116 may be a fiber with large negative dispersion used to reduce or eliminate dispersion effects in the modulated ODB signal, which are caused by the signal propagation trough the fiber 114. The negative dispersion fiber may have an opposite dispersion to that induced by the fiber 114, which sharpens the ODB signal pulse so that it may be correctly decoded by the receiver 118. Specifically, the dispersion compensation fiber may have negative dispersion in the range of about −80 picosecond per nanometer-kilometer (ps/nm·km). For example, a dispersion compensation fiber of 20 km length may compensate for the dispersion in a 100 km length of single mode fiber. In another embodiment, the dispersion compensator 116 may be a fiber Bragg grating (FBG).

The receiver 118 may be another component of system 100. The receiver 118 may be any device, known to persons of ordinary skill in the art, configured to convert the modulated ODB signal into an electrical signal that may be decoded into the initially transmitted binary data stream. In an embodiment, the receiver 118 may comprise an optical detector and signal processing electronics. In an embodiment, the receiver 118 may contain a transmitter substantially as described herein so as to facilitate bi-directional communication in the system 100.

Various alternatives to the architecture depicted in FIG. 1 exist. For example, the fractional-delay module 106 may be located before the data stream signal amplifiers 112. Alternatively, the ODB system 100 may be based on one differential amplifier instead of a pair of matched data stream signal amplifiers 112. The data stream signal differential amplifier may be any electronic amplifier configured to multiply the difference between two inputs by a differential gain factor. For example, the one differential amplifier may receive two complementary data streams with a zero-bit delay from two input ports and transmit one fractional-bit delayed data stream, which is then modulated by a single drive MZ modulator. The fractional-bit delay may be determined by the differential gain factor that is chosen by the operator.

Figure 2A:
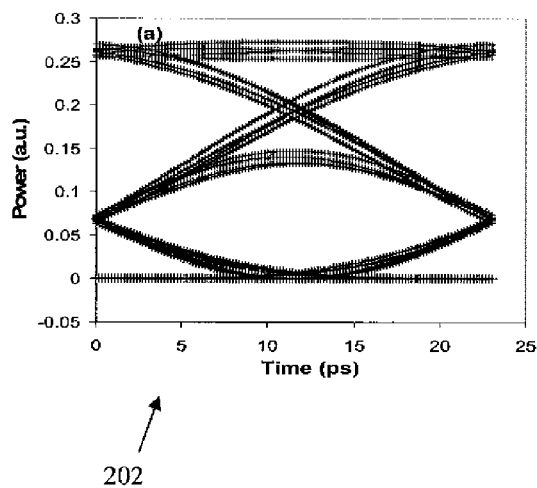
FIG. 2A is an eye diagram of one embodiment of the ODB signals.
Figure 2B:
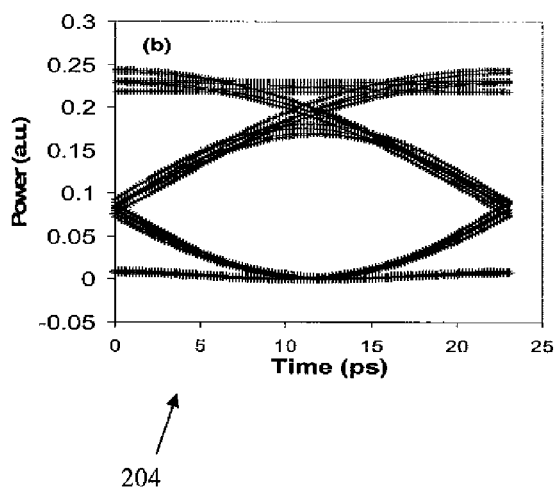
FIG. 2B is another eye diagram of one embodiment of the ODB signals.

FIGS. 2A and 2B illustrate two embodiments of eye diagrams obtained from simulating 40 Gbit/s ODB signals using two cascaded optical interleavers with an overall bandwidth of about 30 GHz or about 70 percent of the data rate. Specifically, FIG. 2A corresponds to a one-bit delayed ODB signal 202, and FIG. 2B corresponds to a 0.7-bit delayed ODB signal 204. The eye diagram may reflect the ODB signal pattern, wherein a relatively open eye pattern corresponds to minimal signal inter-symbol interference (ISI) and noise, while a relatively closed eye pattern corresponds to high ISI and noise. Specifically, the eye opening or peak to peak height is a measure of the additive noise in the signal, while the eye overshoot/undershoot is a measure of the peak ISI. The ISI may be a form of distortion of the ODB signal due to compressing conventional two-level binary signals into a smaller bandwidth. Furthermore, a relatively open eye pattern represents high receiver sensitivity, while a relatively closed eye pattern represents low receiver sensitivity. Both eye diagrams demonstrate improvements in receiver sensitivity and spectral efficiency over traditional modulations, such as NRZ. The smaller eye opening of FIG. 2A may also reflect a one-bit delayed ODB signal 202 that is less resilient to narrow optical filtering, in terms of improvement in receiver sensitivity and spectral efficiency, than the 0.7-bit delayed ODB signal. As shown in FIG. 2B, the 0.7-bit delayed ODB signal has a larger eye opening than the one-bit delayed ODB signal, and hence corresponds to higher receiver sensitivity and spectral efficiency. Specifically, the 0.7-bit delay reflects the optimum differential delay at about 80 percent spectral efficiency at a 40 Gbit/s DWDM transmission rate and 50 GHz channel spacing.

Figure 3:
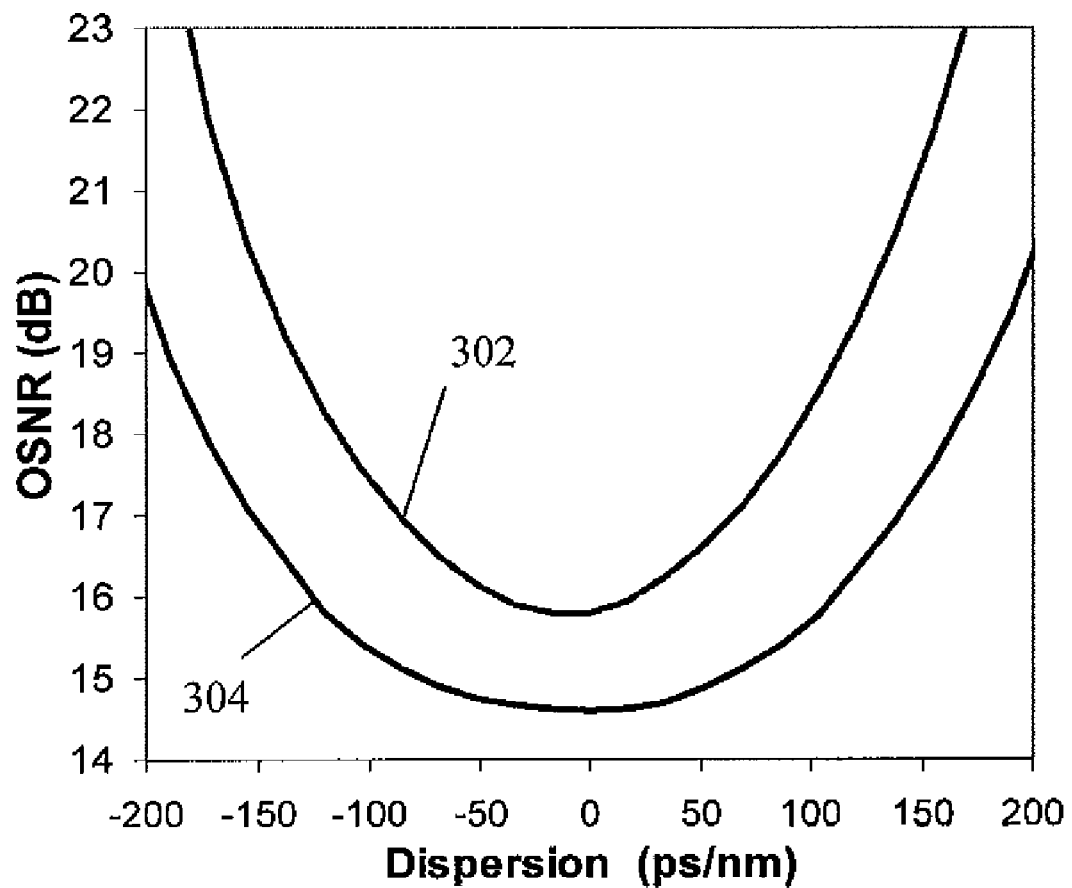
FIG. 3 is a plot of an embodiment of a fractional-bit delay ODB signal.
Figure 3:

FIG. 3 shows an embodiment 300 of optical signal to noise ratio (OSNR) vs. dispersion for both the one-bit delayed ODB signal and the 0.7-bit delayed ODB signal simulated as described above, but with a 43 Gbit/s instead of a 40 Gbit/s modulation rate and optical filter bandwidth of 30 GHz. The OSNR may be an alternate measure to the BER for measuring the receiver sensitivity of an optical transmission system, and may represent the ratio of a signal power to the noise power corrupting the signal. Alternatively, the OSNR may compare the level of a desired optical signal to the level of undesired background noise such that a high OSNR corresponds to less obtrusive background noise. The OSNR may be measured in decibel (dB), which is a logarithmic unit of measurement that expresses the magnitude of the optical power relative to a specified or implied reference level. The OSNR of the one-bit delayed ODB signal 302 at a BER of $10^{-3}$ reveals an eye closure penalty of more than one dB in comparison to the 0.7-bit delayed ODB signal 304. This penalty further increases with an increase in the optical dispersion of the ODB signal in the fiber. Hence, an ODB signal 304 modulated with 0.7-bit delay instead of one-bit delay may be advantageous in terms of improved chromatic dispersion tolerance.

Figure 4:
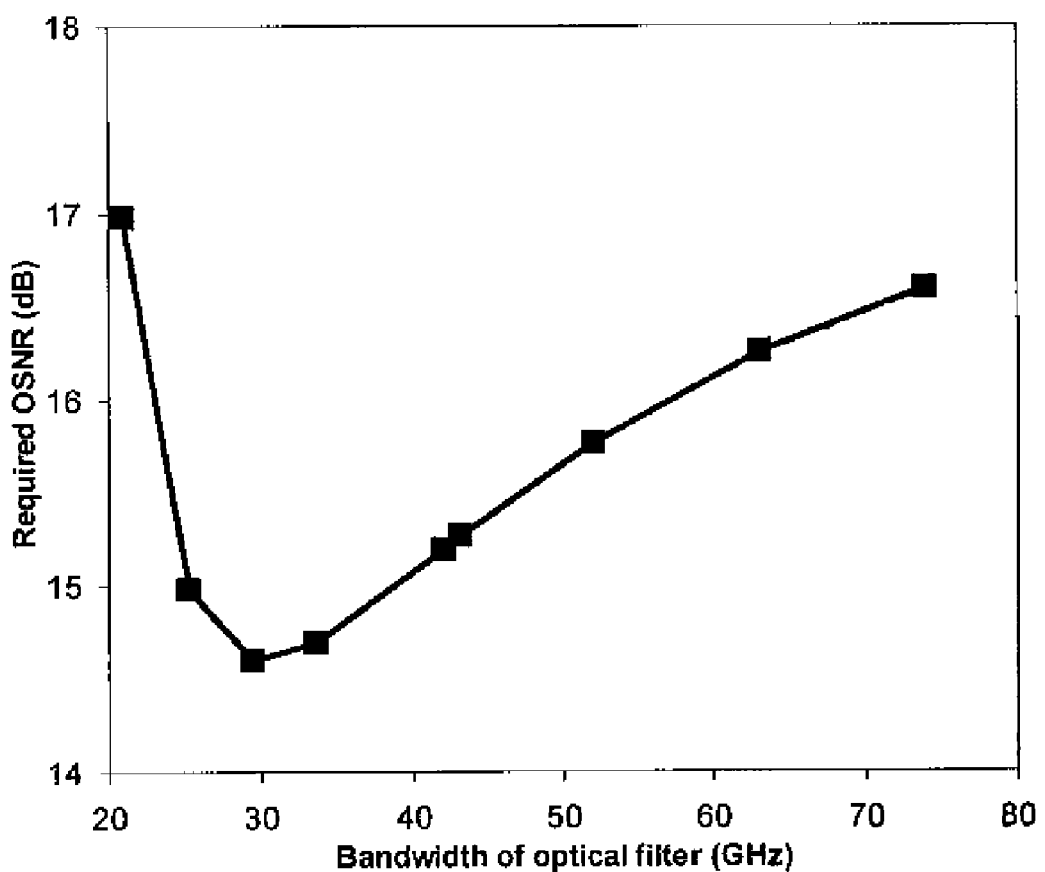
FIG. 4 is a plot of another embodiment of a fractional-bit delayed ODB signal.

FIG. 4 represents another OSNR embodiment 400 for a fractional-bit delay ODB signal at 43 Gbit/s. Specifically, the OSNR values for the 0.7-bit delayed ODB signal are simulated across a range of various optical bandwidths under the same optical system conditions described above. The various optical bandwidths considered herein may represent various optical filters from 20 GHz to 80 GHz. The generated OSNR curve in FIG. 4 comprises a minimum in the OSNR that coincides with an optical filter with a 30 GHz bandwidth at both the transmitter and the receiver ends of the system. The minimum in the OSNR may represent a preferred optical filter bandwidth of about 30 GHz for the 0.7-bit delayed ODB signal, which requires a minimum OSNR corresponding to a $10^{-3}$ BER.

Figure 5:
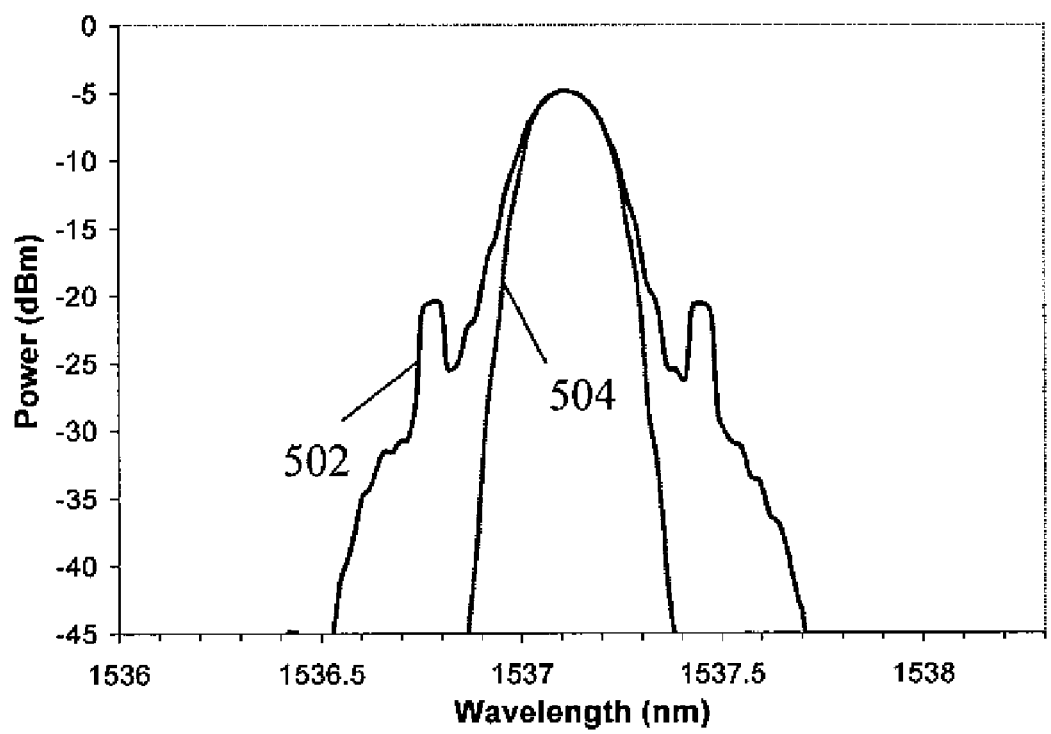
FIG. 5 is a plot of an embodiment of a band-limited fractional-bit delayed ODB signal.

FIG. 5 illustrates one embodiment 500 of a comparison between a band-limited and a non-band-limited fractional-bit delayed ODB signal. In the absence of a band-limited optical filter, the spectrum of a fractional-bit delayed ODB signal may be too wide to operate at narrow channel spacing (e.g. 50 GHz) with satisfactory optical transmission performance. Specifically, the bandwidth of a non-bandwidth limited 40 Gbit/s data rate ODB signal 502 with a 0.7-bit delay that corresponds to 20 dB signal strength may be reduced to half size when an optical filter with 30 GHz bandwidth is added to the system. In the presence of the 30 GHz optical filter, the band-limited ODB signal 504 with a 0.7-bit delay may have a reduced spectral bandwidth and hence propagate longer distances through the optical fiber before undergoing considerable optical dispersion. The narrower spectral bandwidth of the band-limited ODB signal 504 makes it more tolerant to optical dispersion, and thus the band-limited ODB signal 504 may undergo little or negligible distortion over longer transmission distances.

Figure 6:
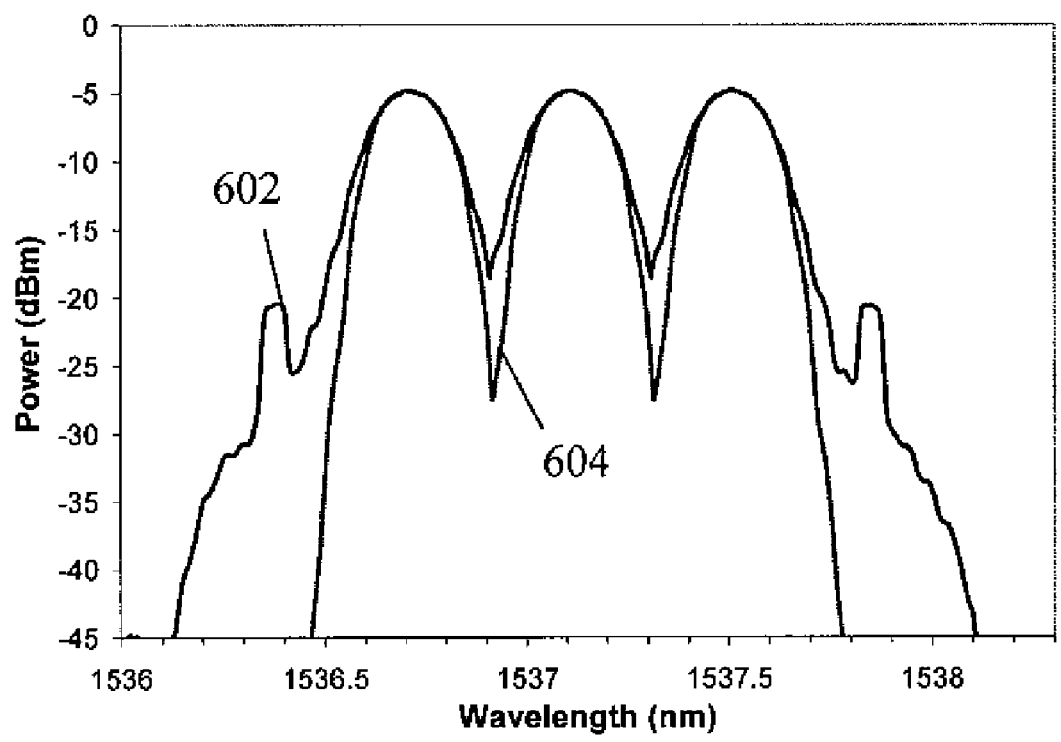
FIG. 6 is a plot of another embodiment of a band-limited fractional-bit delayed ODB signal.
Figure 6:

FIG. 6 illustrates another embodiment 600 of a comparison between a band-limited and a non-band-limited fractional-bit delayed ODB signal. In FIG. 6, three adjacent ODB channels are shown with 50 GHz channel spacing at 40 Gbit/s data and a 0.7-bit delay. The first ODB signal 602 is simulated with the absence of a band-limiting optical filter and the second ODB signal 604 is simulated with the presence of a 30 GHz optical filter. In the case of the ODB signal 604, an improvement as large as 9 dB may be achieved in the crosstalk between the adjacent ODB channels. Without the 30 GHz band-limiting optical filter, the 0.7-bit delayed ODB signal 602 may not operate with good performance at 50 GHz spacing due to significant levels of coherent crosstalk between neighboring channels. Therefore, a band-limiting optical filter at the transmitter and the receiver may be used for 40 Gbit/s ODB systems with 50 GHz channel spacing.

Figure 7:
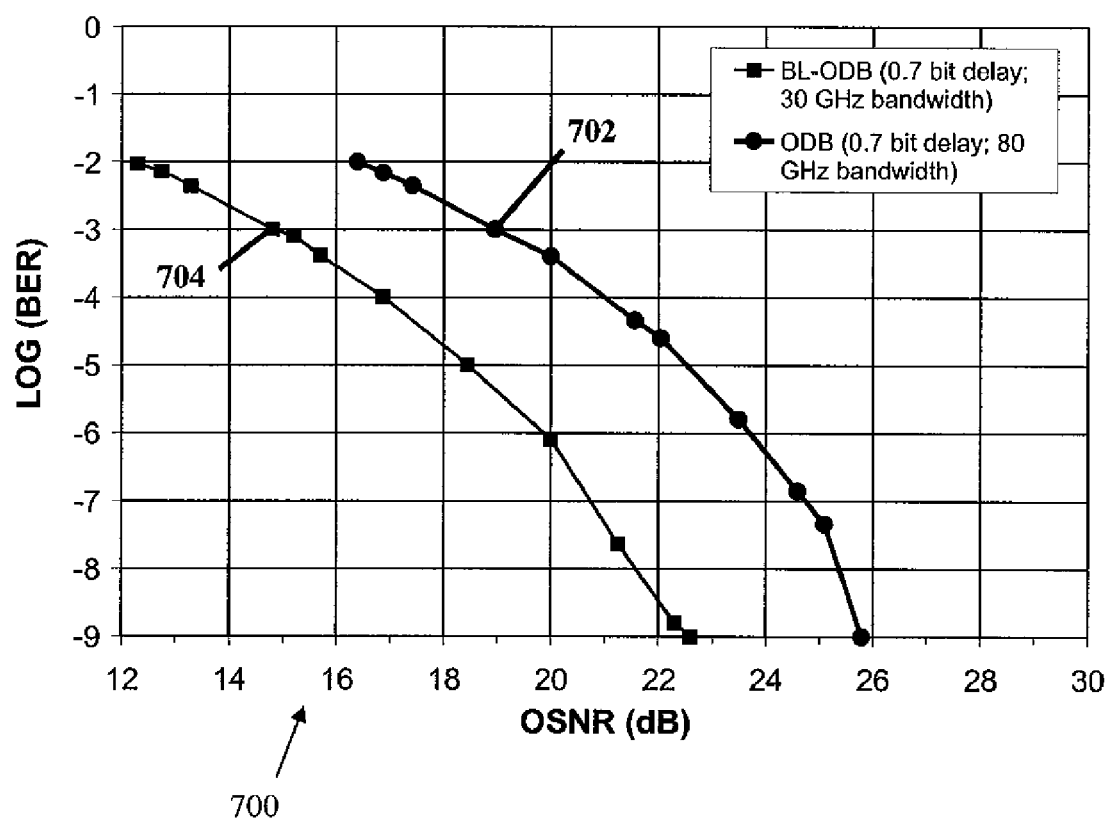
FIG. 7 is a plot of another embodiment of a band-limited fractional-bit delayed ODB signal.

FIG. 7 illustrates an embodiment 700 of BER vs. OSNR behavior of a fractional-bit delayed ODB signal. The BER vs. OSNR behavior is shown in FIG. 7 for a 0.7-bit delayed ODB signal 702 in the absence of band-limiting, with receiver optical filter bandwidth of 80 GHz, as well as for a 0.7-bit delayed band-limited ODB signal 704 with an overall effective bandwidth of 30 GHz. Both ODB signals 702 and 704 are simulated at 43 Gbit/s data rate. In the case of the 0.7-bit delayed band-limited ODB signal 704, an OSNR of 14.8 dB may be required for a BER of $10^{-3}$. On the other hand, an OSNR of 19 dB may be required for an equal BER in the case of the wider bandwidth 0.7-bit delayed ODB signal 702. The reduction in the required OSNR may be another advantage, in addition to the ones presented earlier, for band-limiting the fractional-bit delayed ODB signals.

Figure 8:
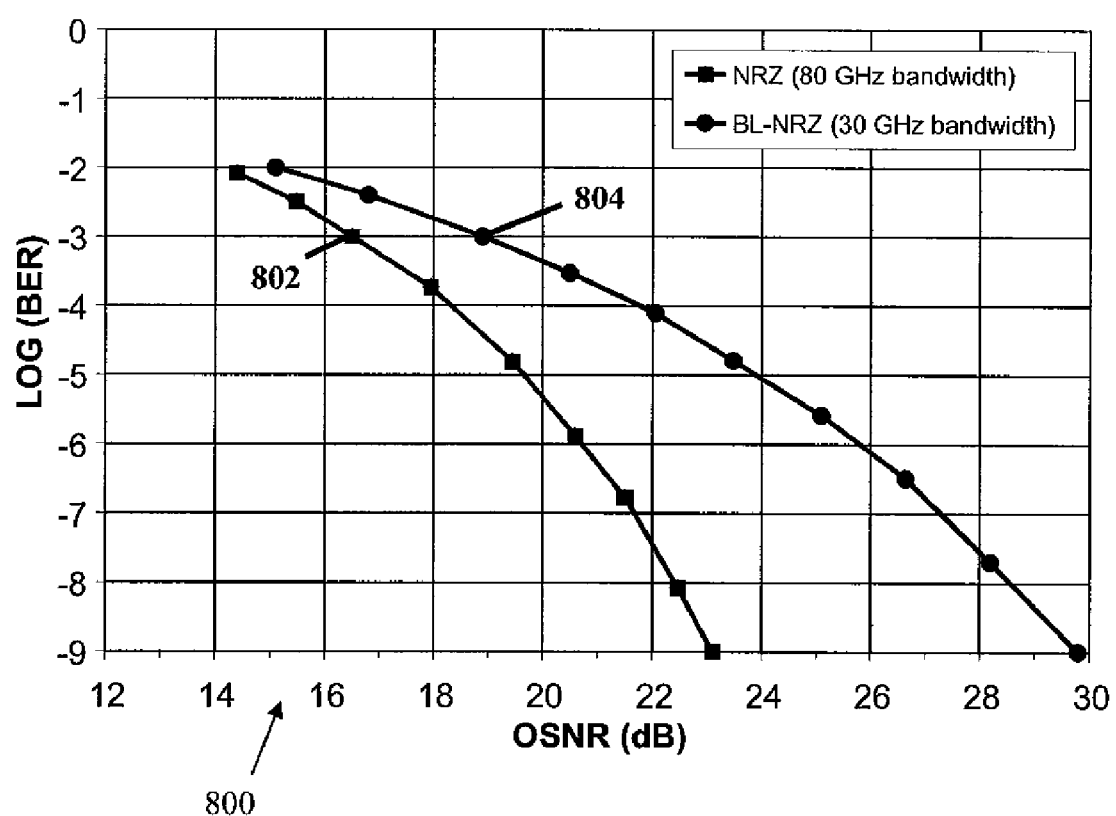
FIG. 8 is a plot of an embodiment of the NRZ modulated signals.

FIG. 8 illustrates an embodiment 800 of BER vs. OSNR behavior of NRZ modulated signals. The BER vs. OSNR behavior is shown in FIG. 8 for a first NRZ modulated signal 802 in the absence of transmitter band-limiting and with receiver optical filter bandwidth of 80 GHz, which is about optimal for this signal. A second NRZ modulated signal 804 with both transmitter and receiver bandwidth limiting and an overall effective bandwidth of 30 GHz is also shown. In the case of the first NRZ modulated signal 802, an OSNR of 16.5 dB may be required for a BER of $10^{-3}$. On the other hand, an OSNR of 19 dB may be required for an equal BER in the case of the second band-limited NRZ modulated signal 804. Unlike the fractional-bit delayed ODB signals, the NRZ modulated signal with the wider bandwidth may be more optimal. In any case, the 0.7-bit delayed ODB signal with 30 GHz overall band-limiting may require a 14.8 dB OSNR (as shown in FIG. 7), and thus may be selected as the preferred modulation format of the optical transmission system. The performance of such ODB signal may be significantly improved over that of an NRZ modulated signal due to considerably lower OSNR requirements. In the absence of transmitter pre-filtering and in the absence of narrow band post-filtering, the most preferred OSNRs may be either the same or worse than that of NRZ modulated signals.

Figure 9:
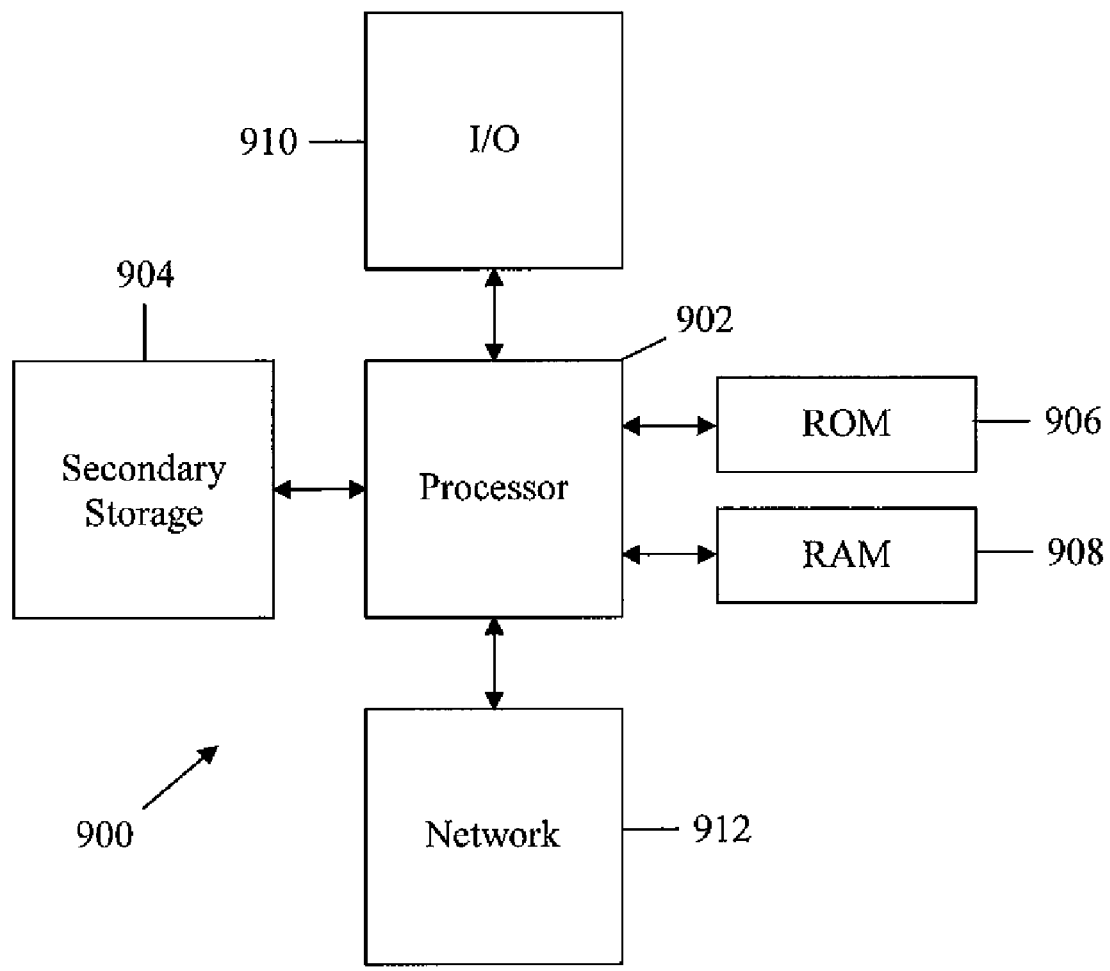
FIG. 9 is a schematic diagram of an exemplary general-purpose computer system.

The network described above may be implemented on any general-purpose network component, such as a computer or network component with sufficient processing power, memory resources, and network throughput capability to handle the necessary workload placed upon it. FIG. 9 illustrates a typical, general-purpose network component suitable for implementing one or more embodiments of a node disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage. The RAM 908 is used to store volatile data and perhaps to store instructions. Access to both ROM 906 and RAM 908 is typically faster than to secondary storage 904.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical network transmitter for optical duobinary signals comprising:
    a fractional-bit delay module;
    a Mach-Zehnder (MZ) optical modulator coupled to the fractional-bit delay module; and
    a band-limiting optical filter coupled to the MZ optical modulator such that the MZ optical modulator is positioned between the band-limiting optical filter and the fractional-bit delay module,
    wherein the band-limiting optical filter is configured to interleave a fractional-bit delayed three-level optical duobinary signal emitted by the MZ optical modulator, and
    wherein the interleaved fractional bit delayed three-level optical duobinary signal has a reduced intermediate optical level as compared with the fractional bit delayed three-level optical duobinary signal emitted modulator.

2. The transmitter of claim 1 further comprising: a data source coupled to the MZ optical modulator via two paths, wherein the fractional-bit delay module is located on only one of the paths and is configured to delay a signal by about 0.7 bits.

3. The transmitter of claim 1 further comprising two amplifiers, wherein the MZ optical modulator is a dual drive optical modulator.

4. The transmitter of claim 1, further comprising a differential amplifier, wherein the MZ optical modulator is a single drive optical modulator.

5. The transmitter of claim 1 further comprising: a distributed feedback laser coupled to the MZ optical modulator, wherein the distributed feedback laser is configured to transmit an optical duobinary signal at about 40 Gbit/s or about 100 Gbit/s.

6. The transmitter of claim 1, wherein the transmitter is in communication with a receiver comprising a second band-limiting optical filter.

7. The transmitter of claim 1, wherein the band-limiting optical filter is an etalon filter or a plurality of cascaded optical interleavers.

8. The transmitter of claim 1, wherein the optical transport network does not comprise a low pass filter.

9. The transmitter of claim 1, wherein the band-limiting optical filter bandwidth is about 70 percent to about 80 percent of the fractional-bit delayed optical duobinary signal data rate.

10. The transmitter of claim 1, wherein the transmitter comprises only one optical modulator, and wherein a center frequency of a signal emitted by the MZ optical modulator is about the same as a center frequency of a signal emitted by the band-limiting optical filter.

11. A method comprising:
    generating two complementary binary data streams;
    delaying one of the complementary binary data streams;
    generating, with a Mach-Zehnder (MZ) optical modulator, a fractional-bit delayed three-level optical duobinary signal using the undelayed complementary binary data stream and the delayed complementary binary data stream;
    interleaving the fractional-bit delayed three-level optical duobinary signal, wherein the interleaved fractional bit delayed three-level optical duobinary signal has a reduced intermediate optical level as compared with the average of a high optical level and a low optical level of the delayed three-level optical duobinary signal; and
    transmitting the interleaved fractional-bit delayed three-level optical duobinary signal to a receiver.

12. The method of claim 11, wherein the delayed complementary binary data stream is delayed by less than one-bit.

13. The method of claim 11, wherein the delayed complementary binary data stream is delayed from about 0.8-bits to about 0.3-bits.

14. The method of claim 11, wherein the delayed complementary binary data stream is delayed by about 0.7-bits.

15. The method of claim 11, wherein the optical duobinary signal is modulated at a rate of about 40 Gbit/s.

16. The method of claim 15, wherein the optical duobinary signal is modulated at a channel spacing of about 50 GHz.

17. The method of claim 15, wherein the optical duobinary signal is filtered at a bandwidth of about 30 GHz, and wherein a center frequency of the modulated optical duobinary signal is about the same as a center frequency of the filtered optical duobinary signal.

18. The method of claim 11, wherein the bandwidth of the fractional-bit delayed optical duobinary signal after the filtering is from about 70 percent to about 80 percent of the fractional-bit delayed optical duobinary signal data rate before the filtering.

19. A transmission system comprising:
    a source configured to generate two complementary binary data streams;
    a fractional-bit delay module in communication with the source and configured to delay one of the complementary binary data streams;
    a Mach-Zehnder (MZ) optical modulation module in communication with the source and the fractional-bit delay module and configured to convert the undelayed complementary binary data streams and the delayed complementary binary data streams into a fractional-bit delayed three-level optical duobinary signal; and
    a band-limiting node in communication with the MZ optical modulation module and configured to interleave the fractional-bit delayed three-level optical duobinary signal,
    wherein the interleaved fractional bit delayed three-level optical duobinary signal has a reduced intermediate optical level as compared with the fractional bit delayed three-level optical duobinary signal emitted by the MZ optical modulator.

20. The system of claim 19, wherein the delayed complementary binary data stream is delayed by about 0.7 bits, wherein the fractional-bit delayed optical duobinary signal is modulated at a data rate of about 40 Gbit/s and transmitted with about 70 percent optimal spectral efficiency, and wherein a center frequency of a signal emitted by the MZ optical modulation module is about the same as a center frequency of a signal emitted by the band-limiting node.

21. The system of claim 20, wherein a drop less than or equal to 9 dB may be achieved in a crosstalk between the optical duobinary channels and an adjacent optical duobinary channel.

22. The system of claim 19, wherein a minimal OSNR of 14.8 ODB corresponding to a $10^{-3}$ BER is achieved for a 0.7-bit delayed optical duobinary signal that is modulated at 43 Gbit/s data rate and filtered at about 30 GHz.

23. The system of claim 17, wherein the band-limiting node bandwidth is from about 70 percent to about 80 percent of the fractional-bit delayed optical duobinary signal data rate.

* * * * *

UNITED STATES PATENT AND TRADEMARK OFFICE
CERTIFICATE OF CORRECTION

| | | |
|---|---|---|
| PATENT NO. | : 8,238,757 B2 | Page 1 of 1 |
| APPLICATION NO. | : 11/865508 | |
| DATED | : August 7, 2012 | |
| INVENTOR(S) | : Yu Sheng Bai et al. | |

It is certified that error appears in the above-identified patent and that said Letters Patent is hereby corrected as shown below:

Cover page item (54) and Col. 1, line 1, Title should read "ODB Transmitter Having an Interleaved Fractional Bit Delayed Three-Level Optical Duobinary Signal with a Reduced Intermediate Optical Level"

Column 9, line 26, claim 1 should read "1. An optical network transmitter for optical duobinary signals comprising: a fractional-bit delay module; a Mach-Zehnder (MZ) optical modulator coupled to the fractional-bit delay module; and a band-limiting optical filter coupled to the MZ optical modulator such that the MZ optical modulator is positioned between the band-limiting optical filter and the fractional-bit delay module, wherein the band-limiting optical filter is configured to interleave a fractional-bit delayed three-level optical duobinary signal emitted by the MZ optical modulator, and wherein the interleaved fractional bit delayed three-level optical duobinary signal has a reduced intermediate optical level as compared with the fractional bit delayed three-level optical duobinary signal emitted by the MZ optical modulator."

Column 12, line 7, claim 23, should read "The system of claim 19, wherein the band-limiting node bandwidth is from about 70 percent to about 80 percent of the fractional-bit delayed optical duobinary signal data rate."

Signed and Sealed this
Eighteenth Day of September, 2012

David J. Kappos
*Director of the United States Patent and Trademark Office*